UNITED STATES PATENT OFFICE 2,137,192

PROCESS FOR THE MANUFACTURE OF 2,4-DIOXO-3,3-DIALKYL-6-METHYL-TETRAHYDRO-PYRIDINE

Otto Schnider, Basel, Switzerland, assignor to Hoffmann-La Roche Inc., Nutley, N. J., a corporation of New Jersey No Drawing. Application November 12, 1937, Serial No. 174,257. In Switzerland December 2, 1936

8 Claims. (Cl. 260—297)

It has been found that 2,4-dioxo-3,3-dialkyl-6-methyl-tetrahydro-pyridine of the general formula

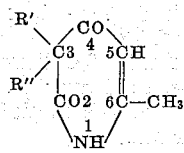

wherein R' and R'' represent alkyl radicals selected from the group consisting of allyl, allyl substituted in the β position and n-propyl radicals, which are valuable soporifics, can also be obtained by treating the corresponding 2,4-dioxo-3,3-dialkyl-6-methyl-pyrandihydride having the formula

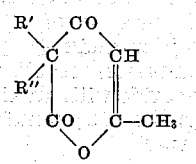

with ammonia, as for example, in accordance with the following equation:

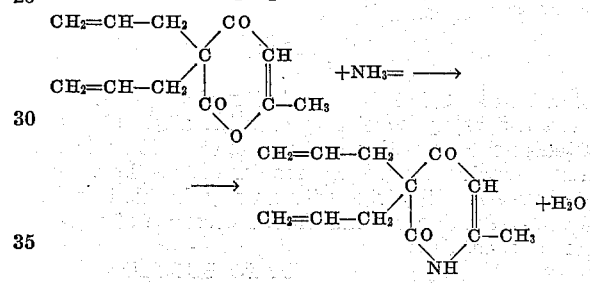

This new process for the manufacture of 2,4-dioxo-3,3-dialkyl-6-methyl-tetrahydro-pyridines can only be carried out with the diallyl- and the dipropyl-compound, and with the analogous compounds substituted in the allyl group. It is not possible to convert α,α-dialkyl-acetoacetic ester into the corresponding pyrandihydrides, nor can the usual methods of alkylation be applied to 6-methyl-2,4-dioxo-pyrandihydride having the formula

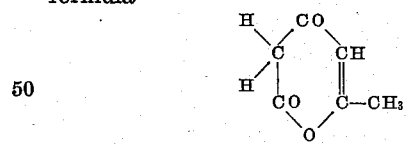

to introduce groups other than allyl. If, however, 6-methyl-2,4-dioxo-pyrandihydride dissolved in aqueous alkali-hydroxide is treated with allyl-halide, two allyl groups can easily be introduced, especially in the presence of copper as a catalyst. The 3,3-diallyl compound thus obtained can be converted into 2,4-dioxo-3,3-dipropyl-6-methyl-pyrandihydride by reduction. Both these pyran derivatives can extraordinarily easily be converted into the corresponding tetra-hydropyridine derivatives by treatment with ammonia. With primary amines, such as methyl-amine, benzyl-amine, etc., they also react readily, but in this case pyridine derivatives do not result but, by the introduction of two molecules of amine, open-chain compounds such as, for instance, α,α-diallyl-β-oxo-δ-methylaminohexene-(γ,δ)-acid-methyl-amide. These 3,3-disubstituted pyran derivatives thus behave differently, in this respect, from the analogous 2,4-dioxo-6-methyl-pyran-dihydride which reacts only at a higher temperature with ammonia and primary amines, but which yields pyridine derivatives in both cases (Berichte der Deutschen Chemischen Gesellschaft, vol. 69, 1936, pages 2379–2380).

The starting material 6-methyl-2,4-dioxo-pyrandihydride is described in Beilstein, Handbuch der Organischen Chemie, Vol. XVII, page 442, as triacetic acid lactone or 4,6-dioxo-2-methyl-(1,-pyran)-dihydride. The nomenclature, triacetic acid lactone, is also used by Collie, in the articles published in Journal of the Chemical Society, Transactions, vol. 59, 1891, page 607 and vol. 91, 1907, page 787. The substance is also described as triacetic lactone or 6-methyl-2,4-dioxo-pyran-dihydride by V. Meyer and P. Jacobson in Lehrbuch der Organischen Chemie, vol. 2, 3rd part, page 710.

Example 206 parts by weight of 2,4-dioxo-3,3-diallyl-6-methyl-pyrandihydride, an oil boiling at 136-139° C. at a pressure of 14 mm., of the formula

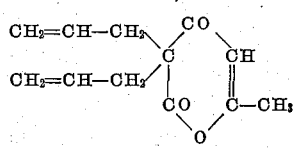

and obtained by the action of allyl-halide on a solution of 2,4-dioxo-6-methyl-pyrandihydride in aqueous alkali hydroxide solution, are vigorously stirred with 400 parts by weight of aqueous ammonia (25 per cent.) at room temperature. The temperature which, at first, rises rapidly, begins to drop again after about ten minutes. The product is now diluted with the same volume of water, whereafter, on continuing the stirring, the reaction product, which, at first, separates as an oily material, solidifies in the form of a crystalline paste. Purification can be effected in the usual manner, for instance by distillation in vacuo and crystallization from benzene-petroleum-ether. The resulting 2,4-dioxo-3,3-diallyl-6-methyl-tetrahydro-pyridine of the formula

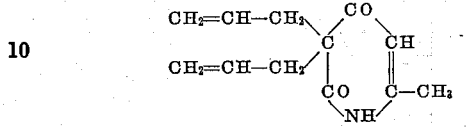

corresponds with the compound obtained by the process described in Example 3 of U. S. Patent 2,090,237.

In exactly the same manner 2,4-dioxo-3,3-di-n-propyl-6-methyl-pyrandihydride having the formula

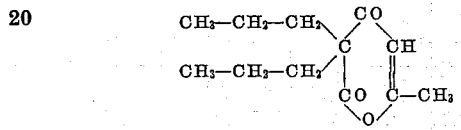

an oil boiling at 135–137° C. at a pressure of 12 mm., can be converted into 2,4-dioxo-3,3-di-n-propyl-6-methyl-tetrahydro-pyridine having the formula

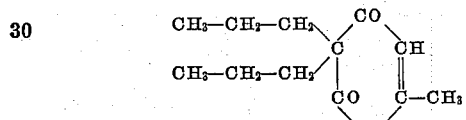

The properties of this compound are described in German Patent 638,532.

I claim:

1. A process for the manufacture of a compound of the formula

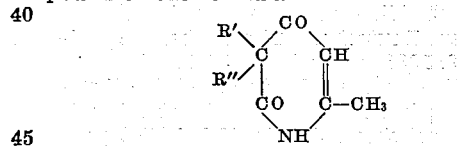

wherein R' and R'' are alkyl radicals selected from the group consisting of allyl, allyl substituted in the β position, and n-propyl radicals which comprises introducing two alkyl radicals selected from the group consisting of allyl, allyl substituted in the β position and n-propyl radicals for the H atoms in the 3 position of 6-methyl-2,4-dioxo-pyrandihydride and then reacting the resulting 3,3-dialkyl derivative with ammonia.

2. The process for the manufacture of 2,4-dioxo -3,3- diallyl -6-methyl - tetrahydropyridine, which comprises reacting 2,4-dioxo-6-methyl-pyrandihydride with allyl halide, and subsequently reacting the 2,4-dioxo-3,3-diallyl-6-methyl-pyrandihydride so obtained with ammonia.

3. The process for the manufacture of 2,4-dioxo-3,3-di-n-propyl -6- methyl-tetrahydropyridine, which comprises reacting 2,4-dioxo-6-methyl-pyrandihydride with an allyl halide, and then subjecting the reaction product so obtained successively to the steps of reduction and the action of ammonia, irrespective of the order of such steps.

4. A compound of the formula

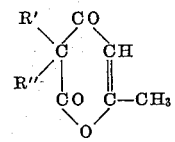

wherein R' and R'' are alkyl radicals selected from the group consisting of allyl, allyl substituted in the β position, and n-propyl radicals.

5. The compound 2,4 - dioxo - 3,3 - diallyl-6-methyl-pyrandihydride.

6. The compound 2,4-dioxo-3,3-di-normal-propyl-6-methyl-pyrandihydride.

7. In a process for the manufacture of compounds of the formula

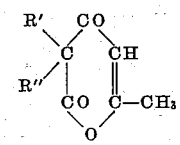

wherein R' and R'' are alkyl radicals selected from the group consisting of allyl, allyl substituted in the β position and n-propyl radicals, the step which comprises reacting 2,4-dioxo-6-methyl-pyrandihydride with an allyl halide.

8. In a process for the manufacture of compounds of the formula

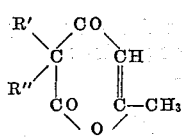

wherein R' and R'' are alkyl radicals selected from the group consisting of allyl, allyl substituted in the β position and n-propyl radicals, the step which comprises reacting 2,4-dioxo-6-methyl-pyrandihydride with an allyl halide in an aqueous alkaline medium in the presence of copper as a catalyst.

OTTO SCHNIDER.